United States Patent [19]

Palmcrantz et al.

[11] 4,170,854
[45] Oct. 16, 1979

[54] JOINT BETWEEN THE LOWER PORTION AND THE MAIN PORTION OF A LOADING CRANE POST AND A METHOD OF PROVIDING SUCH A JOINT

[75] Inventors: Jan B. Palmcrantz, Harmånger; Ulf C. Rilbe, Hudiksvall, both of Sweden

[73] Assignee: HIAB-FOCO Aktiebolag, Sweden

[21] Appl. No.: 860,681

[22] Filed: Dec. 15, 1977

[30] Foreign Application Priority Data

Jan. 18, 1977 [SE] Sweden .............................. 7700459

[51] Int. Cl.² ........................................ E04H 12/34
[52] U.S. Cl. ........................................ 52/115; 182/2; 403/361; 212/58 R
[58] Field of Search ................................. 52/115, 117; 403/359-361; 214/75 H; 212/8 R, 58 R, 66-69; 182/2; 64/1 R, 1 S, 1 C

[56] References Cited

U.S. PATENT DOCUMENTS

| 2,796,998 | 6/1957 | Sundin | 212/66 |
| 3,279,835 | 10/1966 | Krohm et al. | 403/361 |
| 3,477,595 | 11/1969 | Whitfield | 214/75 H |

*Primary Examiner*—James L. Ridgill, Jr.
*Attorney, Agent, or Firm*—Hopkins & Ormsby Newton

[57] ABSTRACT

An improved joint and method of providing such a joint between the upper and lower portions of a rotatably driven crane post, comprising a sleeve-shaped member formed internally with screw threads and provided at the lower end of the upper position, a pin provided at the upper part of the lower post portion and formed externally with screw threads matching the sleeve member threads, and a collar on the lower post portion below the pin against which collar the sleeve-shaped member is pressed upon screwing together of the lower and upper post portions to form said joint.

2 Claims, 3 Drawing Figures

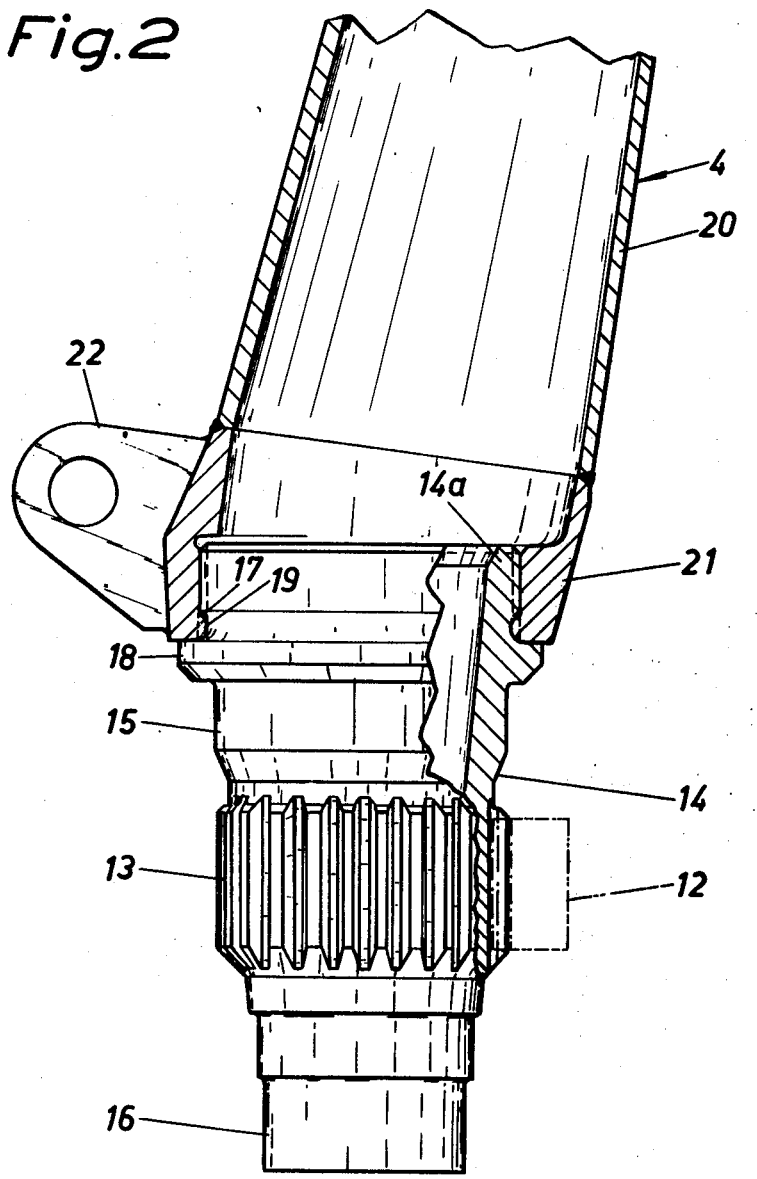

JOINT BETWEEN THE LOWER PORTION AND THE MAIN PORTION OF A LOADING CRANE POST AND A METHOD OF PROVIDING SUCH A JOINT

BACKGROUND OF THE INVENTION

Particularly in large mobile loading cranes, the crane post is as a rule composed of one upper and one lower portion which are joined together to form one single unit. The lower portion serves as a pivot pin mounting the crane post to the crane base and transferring the torsional moment via a toothed gearing, from the crane rotating mechanism, which usually is in the form of a rack arranged for reciprocal displacement. The maximum allowable vehicle width limits the space available for the crane base and its rotating mechanism and in constructing the crane base portion the limited space has made it necessary to form the toothed gear ring directly in the tubular wall of the lower post portion. To meet the requirements on strength made on a cog path, high strength steel must be chosen for the lower post portion.

It is known to join the post portions by welding. However, this requires the use of a weldable steel which in the case of the gear raceway must also be temperable, and consequently tampering and heating treatments of the lower portion of the post become necessary. In addition thereto, this joining method involves problems associated with tensions arising in the material and with structural transformations of the material in the area of the weld. To avoid these problems and the coats connected therewith one wants to be free to choose a high strength steel for the lower crane post portion without having to consider the weldability thereof.

For this purpose one may apply another prior-art method of joining together the crane post portions, according to which method each crane post portion is provided with an annular outer flange by means of which the portions are secured to one another by means of bolts. The flanged bolt bond requires considerable space, however, and in addition the bond is rather heavy on account of the amount of material required therefor. In addition to the disadvantages of heaviness and requirements on space, the increased amount of material and the number of bolts required also attribute to the high costs of the flanged bond.

SUMMARY OF THE INVENTION

The subject invention concerns a new design of the upper and lower portions of a crane post with a view to economize on material, space and costs in comparison with the joining methods hitherto applied. The invention is characterised in that the lower crane post portion, which is fitted with a toothed gear ring, is formed at its upper part with a pin having external screw threads thereon and onto which is screwed a sleeve-shaped member that is provided with matching internal threads therein, this member forming a part of the lower end of the main post portion, and in that a collar is provided on the lower post portion, below the threaded pin, against which collar the sleeve-shaped post portion is pressed.

The invention provides the following advantages: independence of material qualities without necessity to regard the weldability thereof, considerable material and cost savings, and easy replacement of the post portions when necessary as a result of wear, damage or otherwise.

The invention likewise regards a method of providing a joint between the lower portion and the upper portion, i.e. the main portion, of the crane post. The method in accordance with the invention is characterized by the steps of screwing the sleeve-shaped member of the main post portion onto the pin and tightening it about the collar to such a degree as to ensure that the limit of elasticity of the material in an annular zone intermediate the collar and the pin below the screw threads of the latter is exceeded, then unscrewing the main post portion and thereafter screwing the main post portion back onto the pin, however this time, not sufficiently hard to exceed the limit of elasticity.

In accordance with the invention, a condition of prestress is obtained between the post portions in the assembly thereof, whereby a sufficiently large tightening moment is generated to ensure that without need of special fastening means, during crane operations the upper portion of the crane post will not be swivelled loose from the lower portion thereof and that the tensional amplitude in the joint will be sufficiently low to ensure that fatique fractures are avoided.

BRIEF DESCRIPTION OF THE DRAWINGS

The invention will be described in more detail in the following with reference to the accompanying drawings, wherein FIG. 2 illustrates on an enlarged scale and in a partly broken side view the crane post support member by which the crane post is journalled in the crane base, and the lower end of the main portion of the crane post.

DETAILED DESCRIPTION OF A PREFERRED EMBODIMENT

Figure 1:
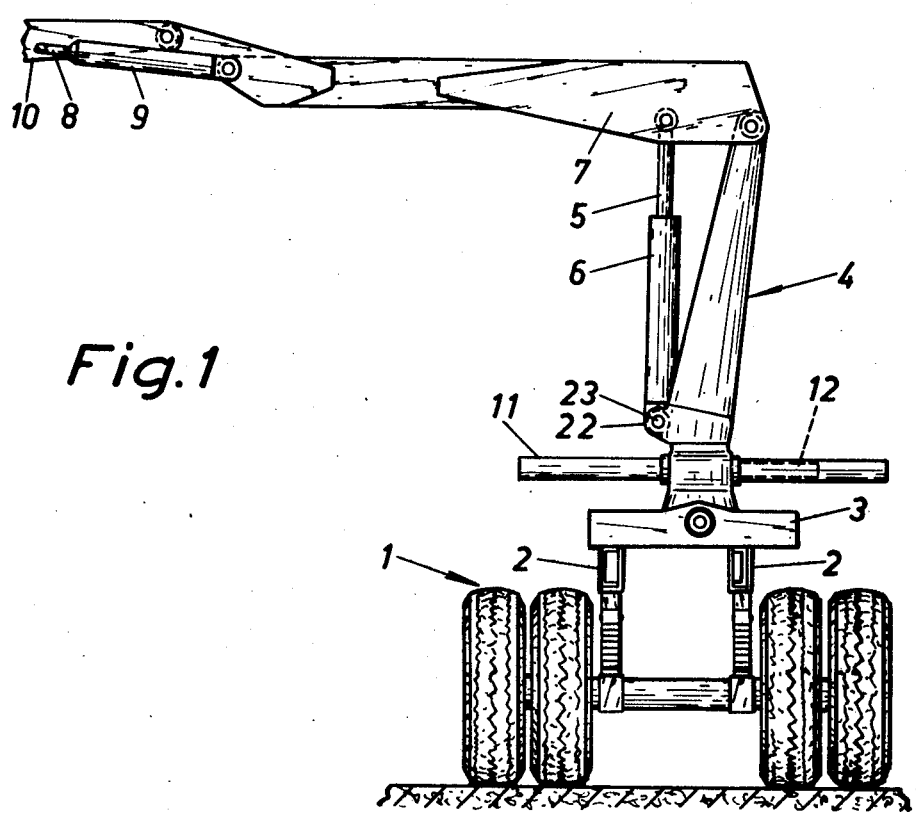
FIG. 1 is a lateral, partly diagrammatical view illustrating a vehicle-mounted loading crane in the operational position thereof.

The loading crane illustrated in FIG. 1 consists of a crane base 3 mounted on the chassis beams 2 of a goods vehicle 1, of a crane post 4 which is rotatably mounted in the crane base, of a crane arm 7 which is arranged to pivot in a vertical plane by means of a hydraulic piston-and-cylinder unit 5, 6, and of a rocker arm 10 which is pivotally mounted at the free end of the crane arm for movements in a vertical plane by means of a second hydraulic piston-and-cylinder unit 8, 9. The rotary movements of the crane post are effected by means of a toothed rack 12 driven by a hydraulic unit 11, displacing the unit to and fro, the teeth of the rack meshing with the teeth of a gear ring 13 which is made in one piece with the lower portion 14 of the crane post 4, which portion 14 serves as the crane post support member. The support surfaces are indicated by numerals 15 and 16. Corresponding internal support surfaces (not shown) are provided in the crane base 3.

The upper end of the tubular support member 14, which end is shaped as a tubular pin 14a, is provided with external screw threads 17 and below these threads with an annular collar 18. Between the latter and the screw threads 17a peripheral groove 19 is provided, serving as a clearance (thread run out) to the screwing tool in the manufacture of the threads.

The main portion 20 of the crane post 4 consists of a tube to the lower end of which is welded a sleeve-shaped member 21. The latter is provided with a lug 22 (or with a number of lugs) through which passes a bolt 23 serving to anchor the lower end of the hydraulic piston-and-cylinder unit 5, 6 to the crane post 4. The sleeve-shaped member 21 is provided with internal screw threads 24 matching the external screw threads 17 formed on the pin 14a.

Owing to this construction it becomes possible to make the support member 14 which forms an easily machined, rotationally symmetrical body, from a steel which gives the gear ring 13 the required strength without having to be weldable. The sleeve-shaped member 21 may be manufactured as a shell-moulded steel casting that is weldable, dimensionally accurate and easily machined by means of shaving tools.

Figure 3:
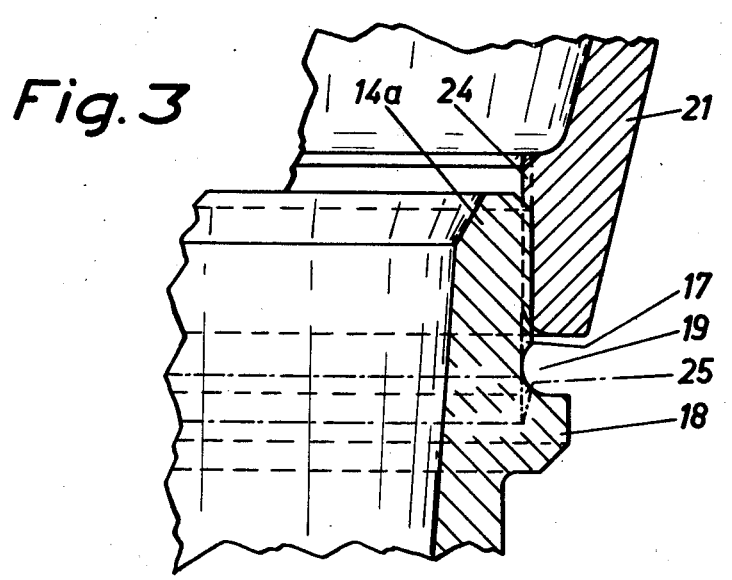
FIG. 3 illustrates on a further enlarged scale a vertical sectional view through a part of the screw joint between the main portion of the crane post and its support portion.

The assembly of the main portion 20, 21 of the crane post 4 and the support member 14 preferably is effected in the following manner. Initially, the crane post portion 20, 21 is screwed onto the pin 14a and is tightened so hard against the collar 18 serving as a support that the stresses on the material in an annular zone 25, FIG. 3, intermediate the collar and the main portion of the support member 14 exceeds the limit of elasticity of the material while the material in the rest of the support member 14 retains its elasticity. The crane post portion 20, 21 is then unscrewed from the pin 14a. The material on either side of the plasticized zone 25 then contracts, building up a compressive stress in this zone. Finally, the crane post portion 4 is screwed back onto the pin 14a, this time, however, not harder than as to ensure that the stresses on the zone of the support member 14 designated by numeral 25 do not exceed the limit of elasticity of the material. The degree of tightening is so adjusted that a prestress condition is obtained in the screw joint corresponding to the maximum stress to which this screw joint is expected to be exposed by the extreme loading moment upon rotation of the crane arm in the horizontal and vertical planes. The advantage is that in this manner the difference between the tensions in the crane post when the crane is in its non-operative position and when it is in its operative position and thus exposed to maximum load, becomes very small.

The prestress obtained as a result of this mounting method ensures that the screw joint becomes sufficiently efficient to allow crane operations without risk of the joint loosening. In addition and thanks to the illustrated design of the lower end of the sleeve-shaped member 21, the provision of the clearance (thread run-out) groove 19, and the support collar 18, the method offers the advantage that stresses on the material, generated as a result of the prestress, may be controlled in such a manner that the fatique strength in the screw joint is improved.

The design of the crane proper is independent of the invention. Essential is meraly the design of the screw joint between the upper and lower portions of the crane post.

What we claim is:

1. In a rotary crane boom including a main post having upper and lower post sections formed of high strength metal and requiring joining without welding and without the use of connecting bolts, the lower post section adapted for rotational mounting on an upright axis on a crane base and including an integral ring gear adapted to be driven by a reciprocating rack, the improvement comprising a thick walled upright axis sleeve member on the bottom of the upper post section and being comparatively short axially and being internally screw-threaded, a coacting thick walled upright axis tubular member on the top of the lower post section and being externally screw-threaded and having screw-threaded engagement within the screw-threaded bore of said sleeve member of the upper post section, and an external continuous rigid flange on said tubular member immediately below the external screw threads thereof and extending radially outwardly of said screw threads and having an upper flat annular face in solid abutment with a coacting bottom flat annular face on said sleeve member when said internal and external screw threads of said sleeve member and tubular member are fully engaged.

2. In a rotary crane boom as defined in claim 1, and an apertured lug formed integrally on said sleeve member and projecting radially therefrom and adapted to serve as an anchor for the lower end of a hydraulic cylinder employed to raise and lower a lifting arm of the crane boom.

* * * * *